United States Patent
Ihrke et al.

(10) Patent No.: US 8,498,741 B2
(45) Date of Patent: Jul. 30, 2013

(54) DEXTEROUS HUMANOID ROBOTIC WRIST

(75) Inventors: Chris A. Ihrke, Hartland, MI (US); Lyndon Bridgwater, Houston, TX (US); David M. Reich, Huntsville, AL (US); Charles W. Wampler, II, Birmingham, MI (US); Scott R. Askew, Houston, TX (US); Myron A. Diftler, Houston, TX (US); Vienny Nguyen, Columbus, OH (US)

(73) Assignees: GM Global Technology Operations, Detroit, MI (US); The United States of America as Represented by the Administrator of the National Aeronautics and Space Administration, Washington, DC (US)

( * ) Notice: Subject to any disclaimer, the term of this patent is extended or adjusted under 35 U.S.C. 154(b) by 912 days.

(21) Appl. No.: 12/564,088

(22) Filed: Sep. 22, 2009

(65) Prior Publication Data

US 2011/0071671 A1    Mar. 24, 2011

(51) Int. Cl.
*B25J 17/00*    (2006.01)
*B25J 17/02*    (2006.01)
*G06F 19/00*    (2011.01)
*B25J 18/04*    (2006.01)

(52) U.S. Cl.
USPC ................................ 700/245; 901/21; 901/36

(58) Field of Classification Search
USPC .. 74/490.01–490.15; 700/245–264; 901/1–50
See application file for complete search history.

(56) References Cited

U.S. PATENT DOCUMENTS

| | | | |
|---|---|---|---|
| 3,572,807 A | 3/1971 | Haaker et al. |
| 3,580,099 A | 5/1971 | Mosher |
| 3,627,372 A | 12/1971 | Carpenter et al. |
| 3,631,737 A | 1/1972 | Wells |
| 3,707,963 A | 1/1973 | Keropian |
| 3,849,668 A | 11/1974 | Dane |
| 3,922,930 A | 12/1975 | Fletcher et al. |
| 4,073,201 A | 2/1978 | Taylor et al. |

(Continued)

FOREIGN PATENT DOCUMENTS

| DE | 3734179 A1 | 4/1989 |
|---|---|---|
| EP | 0190907 A1 | 8/1986 |

(Continued)

OTHER PUBLICATIONS http://robotics.nasa.gov/courses/fall2002/event/oct1/NASA_Robotics_20021001.htm.

*Primary Examiner* — Khoi Tran
*Assistant Examiner* — Dale Moyer
(74) *Attorney, Agent, or Firm* — Quinn Law Group, PLLC

(57) ABSTRACT

A humanoid robot includes a torso, a pair of arms, a neck, a head, a wrist joint assembly, and a control system. The arms and the neck movably extend from the torso. Each of the arms includes a lower arm and a hand that is rotatable relative to the lower arm. The wrist joint assembly is operatively defined between the lower arm and the hand. The wrist joint assembly includes a yaw axis and a pitch axis. The pitch axis is disposed in a spaced relationship to the yaw axis such that the axes are generally perpendicular. The pitch axis extends between the yaw axis and the lower arm. The hand is rotatable relative to the lower arm about each of the yaw axis and the pitch axis. The control system is configured for determining a yaw angle and a pitch angle of the wrist joint assembly.

19 Claims, 4 Drawing Sheets

U.S. PATENT DOCUMENTS

| | | | |
|---|---|---|---|
| 4,113,115 A | 9/1978 | Yoshio | |
| 4,132,318 A | 1/1979 | Wang et al. | |
| 4,246,661 A | 1/1981 | Pinson | |
| 4,353,677 A | 10/1982 | Susnjara et al. | |
| 4,365,928 A | 12/1982 | Baily | |
| 4,499,790 A | 2/1985 | Helms | |
| 4,501,522 A | 2/1985 | Causer et al. | |
| 4,502,347 A | 3/1985 | Norris et al. | |
| 4,512,710 A | 4/1985 | Flatau | |
| 4,531,884 A | 7/1985 | Russell | |
| 4,568,311 A | 2/1986 | Miyake | |
| 4,574,655 A | 3/1986 | Kimura et al. | |
| 4,594,918 A | 6/1986 | Kimura et al. | |
| 4,606,695 A | 8/1986 | Lenz | |
| 4,628,765 A | 12/1986 | Dien et al. | |
| 4,634,889 A | 1/1987 | Foggia et al. | |
| 4,651,591 A | 3/1987 | Wurst | |
| 4,662,814 A | 5/1987 | Suzuki et al. | |
| 4,703,668 A | 11/1987 | Peter | |
| 4,744,264 A | 5/1988 | Milenkovic | |
| 4,762,016 A | 8/1988 | Stoughton et al. | |
| 4,762,455 A | 8/1988 | Coughlan et al. | |
| 4,787,262 A | 11/1988 | Kozawa et al. | |
| 4,790,718 A | 12/1988 | Vickers | |
| 4,804,220 A * | 2/1989 | Rosheim | 294/111 |
| 4,821,594 A * | 4/1989 | Rosheim et al. | 74/490.05 |
| 4,828,453 A | 5/1989 | Martin et al. | |
| 4,862,759 A | 9/1989 | Trevelyan et al. | |
| 4,878,393 A | 11/1989 | Duta et al. | |
| 4,907,937 A | 3/1990 | Milenkovic | |
| 4,919,382 A | 4/1990 | Forman | |
| 4,972,735 A | 11/1990 | Torii et al. | |
| 4,986,723 A | 1/1991 | Maeda | |
| 5,050,450 A | 9/1991 | Nakamura | |
| 5,101,681 A | 4/1992 | Shpigel | |
| 5,231,889 A | 8/1993 | Lee et al. | |
| 5,243,873 A | 9/1993 | Demers | |
| 5,447,403 A | 9/1995 | Engler, Jr. | |
| 5,596,254 A | 1/1997 | Vaughn et al. | |
| 5,697,256 A | 12/1997 | Matteo | |
| 5,740,699 A | 4/1998 | Ballantyne et al. | |
| 5,765,443 A | 6/1998 | Murase et al. | |
| 5,845,540 A * | 12/1998 | Rosheim | 74/490.05 |
| 5,966,991 A | 10/1999 | Gosselin et al. | |
| 5,967,580 A * | 10/1999 | Rosheim | 294/198 |
| 6,026,703 A | 2/2000 | Stanisic et al. | |
| 6,244,644 B1 | 6/2001 | Lovchik et al. | |
| 6,658,962 B1 * | 12/2003 | Rosheim | 74/490.05 |
| 6,741,911 B2 | 5/2004 | Simmons | |
| 7,013,750 B1 | 3/2006 | Kazami | |
| 7,296,835 B2 | 11/2007 | Blackwell et al. | |
| 2003/0101838 A1 | 6/2003 | Shinozaki | |
| 2005/0222587 A1 | 10/2005 | Jinno et al. | |
| 2008/0075561 A1 | 3/2008 | Takemura et al. | |
| 2008/0103492 A1* | 5/2008 | Morley et al. | 606/1 |
| 2009/0071282 A1 | 3/2009 | Takemura | |
| 2010/0010670 A1 | 1/2010 | Matsukuma et al. | |

FOREIGN PATENT DOCUMENTS

| | | |
|---|---|---|
| FR | 2565881 A1 | 12/1985 |
| JP | 4008491 A | 1/1992 |
| WO | 9213213 A1 | 8/1992 |
| WO | 03080297 A1 | 10/2003 |

\* cited by examiner

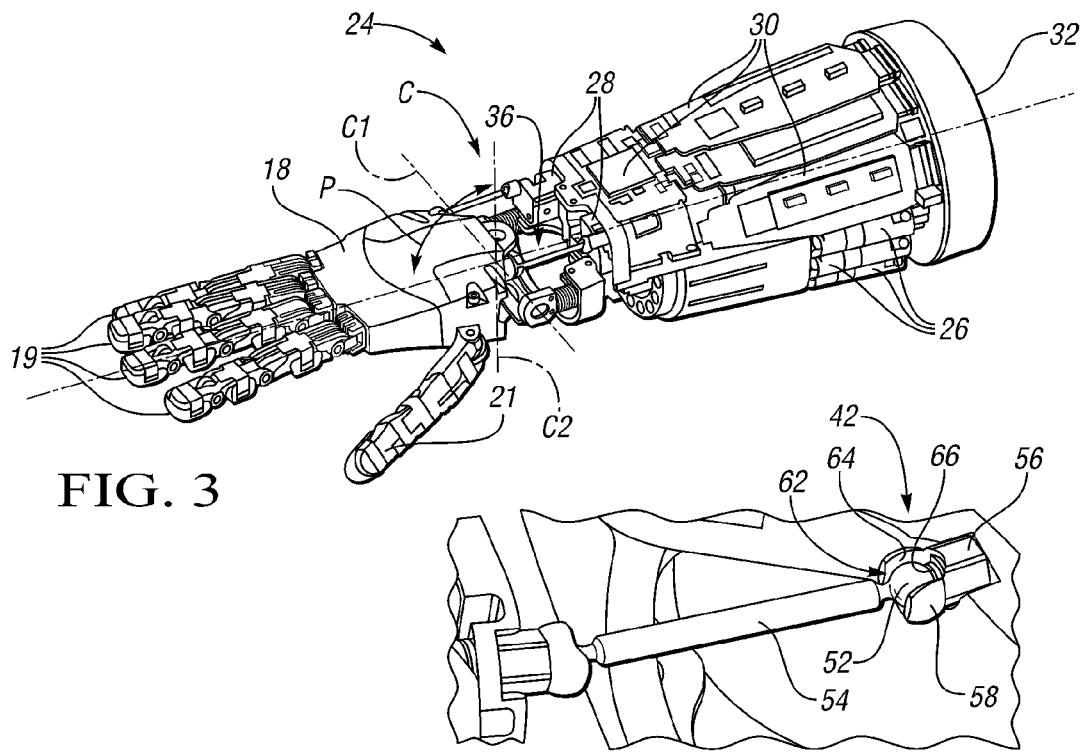
FIG. 3
FIG. 4A
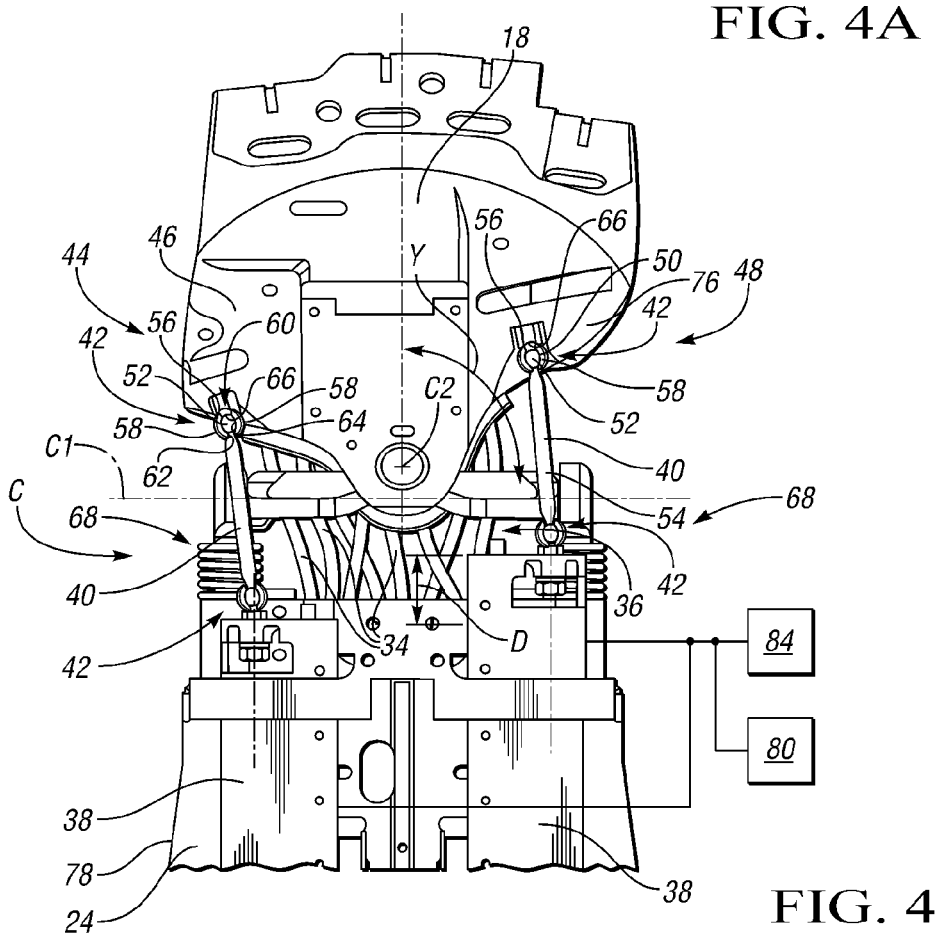
FIG. 4

DEXTEROUS HUMANOID ROBOTIC WRIST

STATEMENT REGARDING FEDERALLY SPONSORED RESEARCH OR DEVELOPMENT

This invention was made with government support under NASA Space Act Agreement number SAA-AT-07-003. The government may have certain rights in the invention.

TECHNICAL FIELD

The present invention relates to a wrist of a humanoid robot.

BACKGROUND OF THE INVENTION

Robots are automated devices that are able to manipulate objects using a series of rigid links, which in turn are interconnected via articulations or motor-driven robotic joints. Each joint in a typical robot represents an independent control variable, also referred to as a degree of freedom (DOF). End-effectors are the particular links used for performing a task at hand, e.g., grasping a work tool or an object. Therefore, precise motion control of a robot may be organized by the level of task specification: object level control, i.e., the ability to control the behavior of an object held in a single or cooperative grasp of a robot, end-effector control, and joint level control. Collectively, the various control levels cooperate to achieve the required robotic mobility, dexterity, and work task-related functionality.

Humanoid robots in particular are robots having an approximately human structure or appearance, whether a full body, a torso, and/or an appendage, with the structural complexity of the humanoid robot being largely dependent upon the nature of the work task being performed. The use of humanoid robots may be preferred where direct interaction is required with devices or systems that are specifically made for human use. Due to the wide spectrum of work tasks that may be expected of a humanoid robot, different control modes may be simultaneously required. For example, precise control must be applied within the different spaces noted above, as well control over the applied torque or force, motion, and the various grasp types.

In order to approximate human movement each major joint within the robot, such as waist or arm joints, requires at least one actuator for each DOF. However, in a multi-fingered hand, it may be advantageous to drive some combinations of finger joints from a common actuator, so that there are fewer actuators than finger joints. Nevertheless, a highly dexterous hand will have a plurality of actuators, perhaps as many as a dozen or more, to enable a variety of grasp configurations and fine manipulation of grasped objects. Additionally, these actuators must be packaged in an arrangement that approximately represents human structure and appearance.

SUMMARY OF THE INVENTION

Accordingly, a wrist joint assembly is provided herein that is operatively defined between a lower arm and a hand of a humanoid dexterous robot. The wrist joint assembly includes a yaw axis and a pitch axis. The pitch axis is disposed in a spaced relationship to the yaw axis such that the axes are generally perpendicular. The pitch axis extends between the yaw axis and the lower arm. The hand is rotatable relative to the lower arm about each of the yaw axis and the pitch axis.

In another aspect, an arm assembly of a humanoid dexterous robot includes a lower arm, a hand, a wrist joint assembly, and a control system. The hand is rotatable relative to the lower arm. The wrist joint assembly is operatively defined between the lower arm and the hand. The wrist joint assembly includes a yaw axis and a pitch axis. The pitch axis is disposed in a spaced relationship to the yaw axis such that the axes are generally perpendicular. The pitch axis extends between the yaw axis and the lower arm. The hand is rotatable relative to the lower arm about each of the yaw axis and the pitch axis. The control system is configured for determining a yaw angle and a pitch angle of the wrist joint assembly.

In yet another aspect, a humanoid robot includes a torso, a pair of arms, a neck, a head, a wrist joint assembly, and a control system. The arms movably extend from the torso. Each of the arms includes a lower arm and a hand that is rotatable relative to the lower arm. The neck movably extends from the torso. The head movably extends from the neck. The wrist joint assembly is operatively defined between the lower arm and the hand. The wrist joint assembly includes a yaw axis and a pitch axis. The pitch axis is disposed in a spaced relationship to the yaw axis such that the axes are generally perpendicular. The pitch axis extends between the yaw axis and the lower arm. The hand is rotatable relative to the lower arm about each of the yaw axis and the pitch axis. The control system is configured for determining a yaw angle and a pitch angle of the wrist joint assembly.

The above features and advantages and other features and advantages of the present invention are readily apparent from the following detailed description of the best modes for carrying out the invention when taken in connection with the accompanying drawings.

BRIEF DESCRIPTION OF THE DRAWINGS

FIG. 3 is a schematic perspective illustration of a lower arm for the dexterous humanoid robot of FIGS. 1 and 2;

FIG. 4 is a schematic illustration of a back view of the lower arm for the dexterous humanoid robot of FIGS. 1 and 3 having links for moving a hand;

FIG. 4A is an enlarged schematic illustration of a link for the lower arm for the dexterous humanoid robot of FIGS. 1, 3 and 4;

DESCRIPTION OF THE PREFERRED EMBODIMENT

Figure 1:
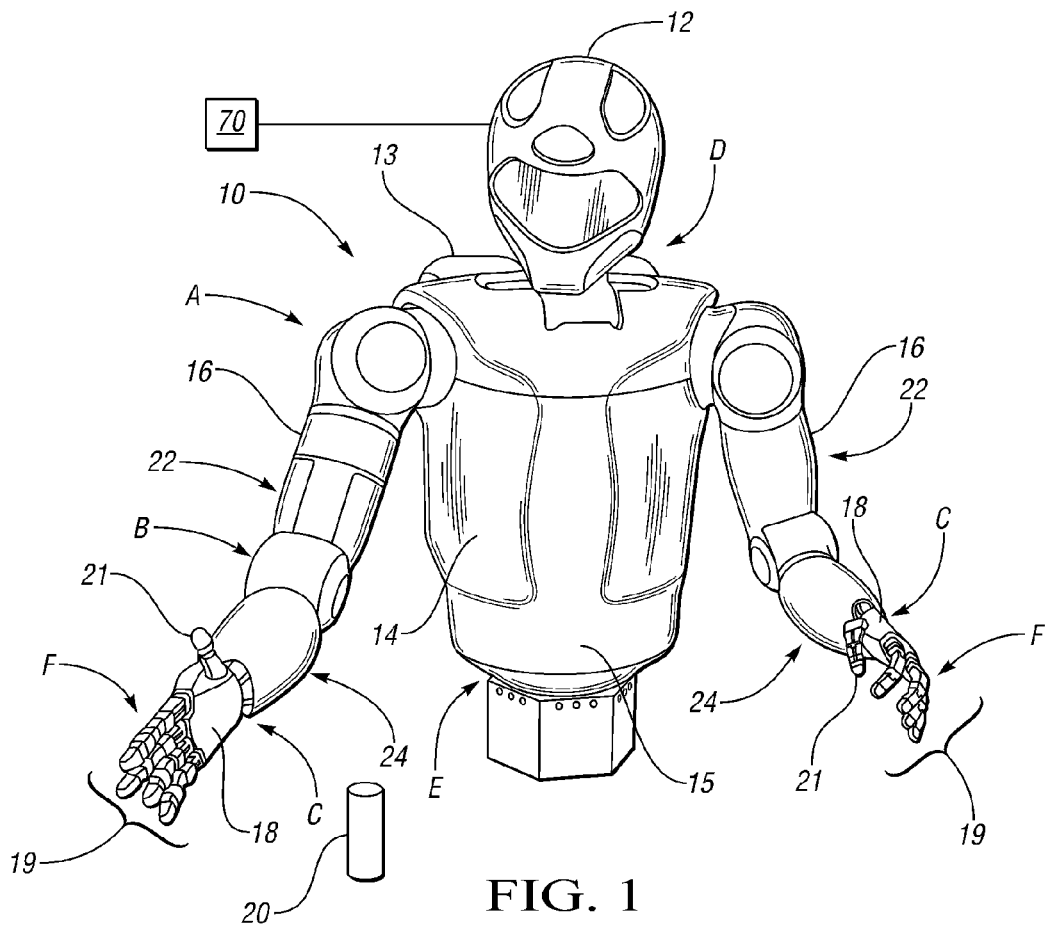
FIG. 1 is a schematic perspective illustration of a dexterous humanoid robot and in accordance with the invention.

With reference to the drawings, wherein like reference numbers refer to the same or similar components throughout the several views, FIG. 1 shows a dexterous humanoid robot 10 adapted to perform one or more tasks with multiple degrees of freedom (DOF).

The humanoid robot 10 may include a head 12, torso 14, waist 15, arms 16, hands 18, fingers 19, and thumbs 21, with the various joints being disposed within or therebetween. A power supply 13 may be integrally mounted to the robot 10, e.g., a rechargeable battery pack carried or worn on the back of the torso 14 or another suitable energy supply, to provide sufficient electrical energy to the various joints for movement of the same.

According to one embodiment, the robot 10 is configured with a plurality of independently and interdependently-moveable robotic joints, such as but not limited to a shoulder joint assembly (arrow A), an elbow joint assembly (arrow B), a wrist joint assembly (arrow C), a neck joint assembly (arrow D), and a waist joint assembly (arrow E), as well as the various finger joint assemblies (arrow F) positioned between the phalanges of each robotic 10 finger 19.

Each robotic joint may have one or more DOF. For example, certain joints such as the shoulder joint assembly (arrow A) and elbow joint assembly (arrow B) may have at least two DOF in the form of pitch and roll. Likewise, the neck joint assembly (arrow D) may have at least three DOF, while the waist and wrist assemblies (arrows E and C, respectively) may have one or more DOF. Depending on task complexity, the robot 10 may move with over 40 DOF. Although not shown in FIG. 1 for simplicity, each robotic joint in the waist (arrow E), neck (arrow D), and arms (arrows A and B) contains and is driven by one or more actuators, e.g., joint motors, linear actuators 38, rotary actuators, and the like. Finger joints (arrow F) are also driven by actuators 26, but it may be advantageous to mechanically couple some finger 19 motions so that in some cases one actuator 26 may drive several finger joints (arrow F). If the finger joints (arrow F) are driven by tendons 34, which can only pull and cannot push, return motion requires either spring loading or an additional return tendon 34 with its own actuator 26.

The arm 16 is divided into an upper arm 22 and a lower arm (or forearm) 24. The upper arm 22 extends from the shoulder joint assembly (arrow A) to the elbow joint assembly (arrow B). Extending from the elbow joint (arrow B) is the lower arm 24, hands 18, fingers 19, and thumbs 21. For the purpose of simplification, as described herein, the upward direction is toward the head 12 and the downward direction is toward the waist 15.

Figure 2:
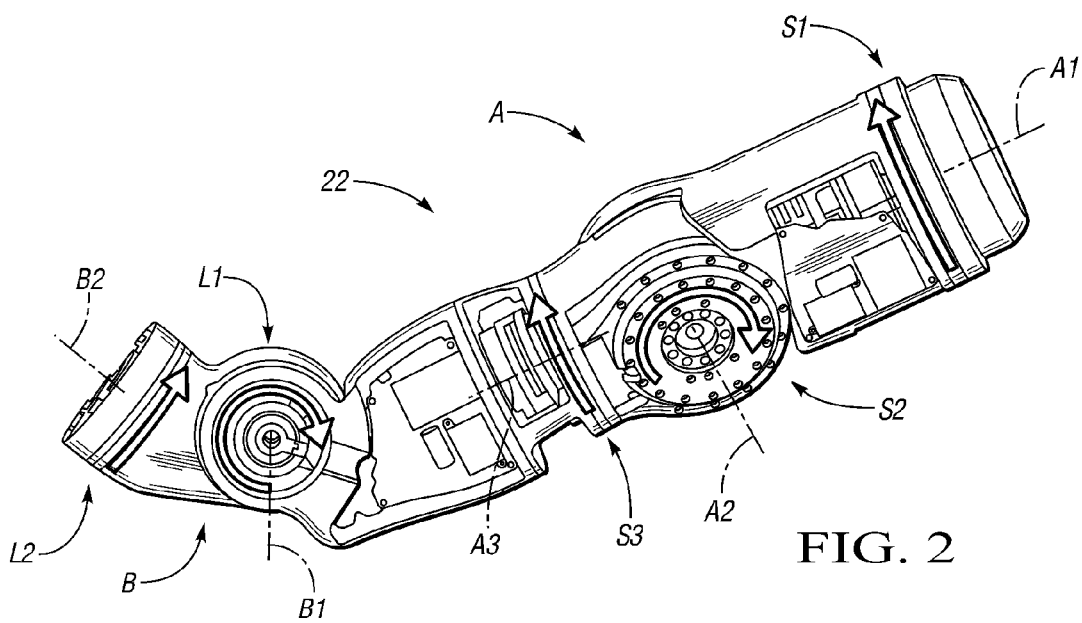
FIG. 2 is a schematic perspective illustration of an upper arm for the dexterous humanoid robot of FIG. 1.

Referring to FIG. 2, the upper arm 22 is illustrated. Although only one upper arm 22 for the arms 16 is shown, both the left and the right arms 16 operate in the same manner as described below. The upper arm 22 has a shoulder joint assembly (arrow A) that includes a first shoulder joint S1 providing a first DOF, and second shoulder joint S2 providing a second DOF, and a third shoulder joint S3 providing a third degree of freedom. Together the first through third shoulder joints S1, S2, S3 perform the movements that represent the movements a human shoulder can perform. Specifically, rotation of the first shoulder joint S1 about a first shoulder axis A1 moves a second shoulder axis A2 for the second shoulder joint S2 into a desired position. Based upon the position of the first shoulder joint S1, rotation of the second shoulder joint S2 about the second shoulder axis A2 then moves the arm 16 up and down relative to the torso 14, or forward and backward relative to the torso 14. The third shoulder joint S3 rotates the upper arm 22 about a third shoulder axis A3. Rotation of the third shoulder joint S3 rotates the upper arm 22 axially, i.e. rotation of the third shoulder joint S3 rotates the elbow joint assembly (arrow B) to face upwards or downwards. Therefore, together the first shoulder joint S1, the second shoulder joint S2, and the third shoulder joint S3 form the motions of a shoulder joint assembly (arrow A).

The upper arm 22 also includes an elbow joint assembly (arrow B) which includes a first elbow joint L1 and a second elbow joint L2. The first elbow joint L1 and second elbow joint L2 each provide a degree of freedom. Together the first elbow joint L1, and the second elbow joint L2 perform the movements that represent the movements a human elbow can perform. Rotation of the first elbow joint L1 about a first elbow axis B1 causes the upper arm 22, below the elbow joint assembly (arrow B) to bend and straighten. Additionally, rotation of the second elbow joint L2 about a second elbow axis B2 causes the upper arm 22, below the elbow joint assembly (arrow B) to rotate axially, i.e. rotation of the second elbow joint L2 about the second elbow axis B2 rotates the lower arm 24 and hand 18 (FIG. 1) to face palm up or down.

FIG. 3 illustrates the lower arm 24, including the wrist joint assembly (arrow C), the hand 18, the fingers 19, and thumb 21. The lower arm 24 includes a plurality of finger 19 (and thumb 21) actuators 26 and a plurality of wrist actuators 28. Additionally, a plurality of electronics 30 configured for controlling the finger actuators 26 and the wrist actuators 28 are also supported on the lower arm 24. The lower arm 24 is attached to a load cell 32 which is used to connect the lower arm 24 with the upper arm 22.

The wrist joint assembly (arrow C) is disposed between the hand 18 and a lower arm 24. The wrist joint assembly (arrow C) is configured with a large range of motion, typically described in terms of a pitch axis C1 and a yaw axis C2. The pitch axis C1 is disposed in a spaced relationship to the yaw axis C2 such that the axes are generally perpendicular. More specifically, the pitch axis C1 is positioned between the yaw axis C2 and the lower arm 24 such that the pitch axis C1 and the yaw axis C2 do not intersect. Likewise, the yaw axis C2 is positioned between the pitch axis C1 and the hand 18. The fingers and the thumb 21 require multiple actuators (not shown) to provide power and positional control. For example, a single finger might have four or five joints which need to be independently controllable. In some designs, a palm of the hand 18 may have additional motion capability to conform to the shape of an object being grasped. At the same time, to facilitate the hand 18 reaching into constricted areas, it is desirable that the hand 18 has a slim profile. To accomplish this, it may be preferable to locate the actuators in the forearm and to transmit mechanical power to the hand 18 via tendons or other such slender transmission elements 34. Such a hand 18 is sometimes said to be "extrinsically actuated" in contrast to "intrinsically actuated" hands 18 that contain their own actuators. With four or five fingers 19 and thumbs 21, each having up to five degrees of freedom, the hand 18 may easily require a dozen or more actuators. In order to package the required number of actuators in an intrinsically actuated hand 18, smaller actuators are used. As a result, the intrinsically actuated hands 18 typically become too bulky, too slow, and/or too weak to perform the required dexterous work.

The wrist joint assembly (arrow C) for a dexterous robot 10 with an extrinsically actuated hand 18 is configured to provide a large range of pitch motion, about the pitch axis C1, and a wide range of yaw motion, about the yaw axis C2. Additionally, the wrist joint assembly is configured to be slender, i.e., have a slim profile, such that the hand 18 and the wrist joint assembly may perform dexterous work in constricted areas. The wrist joint assembly defines a pass-through 36, i.e., an open space, which is configured to accommodate the transmission elements 34 that connect the actuators in the forearm to the joints in the hand 18 and/or fingers. When the transmission elements 34 are tendons, which are configured to only pull, not push, it may be desirable to provide antagonistic actuators (not shown) to maintain tension in the system. The wrist joint assembly (arrow C) also needs to be configured to be sufficiently strong and operate with sufficient speed to support the hand 18 doing useful work, when compared to humans.

Referring to FIGS. 4 and 4A, the wrist joint assembly must also be actuated to achieve the yaw and pitch rotations about the respective yaw and pitch axes C2, C1. A pair of linear actuators 38 are slidably disposed in the lower arm 24 in a spaced relationship and are generally parallel to one another. A link 40 operatively interconnects a respective one of the pair of linear actuators 38 and the hand 18. The links 40 are operatively interconnected to the linear actuator 38 and the wrist via ball joints 42. The links 40 extend in spaced relationship and are generally parallel to one another. The linear actuators 38 operatively connect the forearm to the hand 18 to achieve the motion of rotation of the hand 18 about the yaw and pitch axes C2, C1, relative to the lower arm 24. Each linear actuator 38 is configured to provide a long linear travel range to rotate the wrist about the yaw and/or pitch axis C2, C1, at a sufficient speed and force. In a preferred embodiment, the linear travel range of the linear actuator 38 is about 100 mm, the speed is about 80 mm/s, and the force ranges from about 320 N to about 1320 N, continuous. Two of the linear actuators 38 may be coupled with a desired kinematic arrangement to result in a wrist speed of about 120 degrees/second about the pitch and yaw axes C1, C2; a peak torque of about 200 Nm about the pitch axis C1 and of about 150 Nm about the yaw axis C2; and a continuous wrist torque of about 25 Nm about each of the pitch and yaw axes C1, C2.

Figure 5:
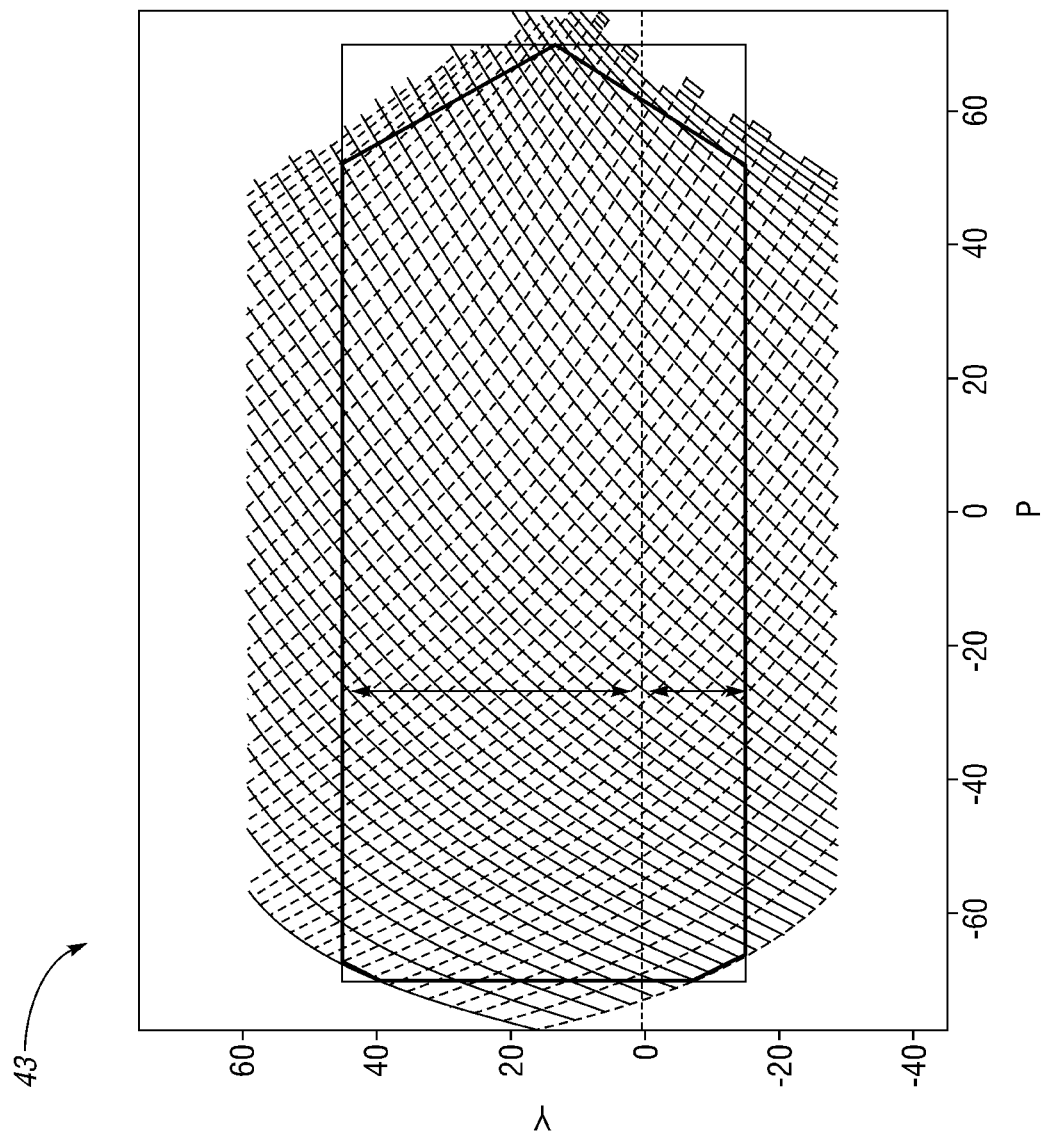
FIG. 5 is a schematic graphical illustration representing yaw and pitch angles of a wrist joint assembly of the lower arm for the dexterous humanoid robot of FIGS. 1, 3, and 4.

The wrist joint assembly is configured such that the relation between the displacement of the linear actuators 38 in the forearm and the resulting pitch and yaw of the wrist joint assembly (arrow C) are nonlinearly coupled and depend on a geometric placement of the ball joints 42 in the palm, the location of a line of actuation of the linear actuators 38 in the forearm, and the geometric relation of the linear actuators 38 to the pitch and yaw joints. Referring to FIG. 5, a graphical representation of the angles P, Y of rotation about the yaw and pitch joints that were derived from a mathematical analysis (described in more detail below) is shown at 43. By taking full advantage of all these geometric parameters, FIG. 5 shows that the wrist joint assembly (arrow C) can achieve a large range of pitch motion, i.e., approximately 140 degrees of total travel, and a large range of yaw motion, i.e., approximately 60 degrees of total travel. Singularity-free operation with good conditioning for maintaining a near uniform accuracy and strength throughout the operating workspace of the hand 18 and/or the wrist joint assembly (arrow C) may also be achieved with this configuration of the wrist joint assembly (arrow C). Referring again to FIG. 5, asymmetric travel about the yaw axis C2 is provided, i.e., approximately −15 degrees to approximately 45 degrees, because the thumb side 44 of the hand 18 precludes travel to one side, due to what would otherwise be a collision of the thumb 21 and a support structure 46 for the thumb 21 of the hand 18 with the lower arm 24, while allowing the hand 18 to rotate more toward a pinky side 48 of the hand 18. It should be appreciated that this asymmetry mimics the motion of the human wrist, which is subject to the same rotational constraints about the yaw axis C2. As a result, a slender wrist joint assembly (arrow C) is achieved.

To accommodate the large range of motion, while maintaining good strength, the wrist joint assembly (arrow C) includes a plurality of the ball joints 42. Each of the ball joints 42 includes a socket portion 50 and a ball portion 52. Each link 40 includes a rod portion 54 and one of the ball portions 52 extends from opposing ends of the respective rod portion 54. One of the socket portions 50 operatively extends from a respective one of the linear actuators 38. Additionally, a pair of the socket portions 50 operatively extends from the hand 18. More specifically, one of the other socket portions 50 may extend from the support structure 46 on the hand 18, near the thumb side 44, and the other socket portion 50 may extend from the hand 18, near the pinky side 48. The ball portions 52 of each link 40 are in engagement with one of the socket portions 50 of the hand 18 and of the corresponding linear actuator 38 such that the link 40 articulates relative to the respective socket portion 50. Each socket portion 50 includes a base portion 56 and a pair of flange portions 58. The pair of flange portions 58 extend from the base portion 56 in spaced relationship to define a socket opening 60 therebetween. The socket opening 60 is configured to receive the respective ball portion 52. A slit 62 is defined between edges 64 of the pair of flange portions 58. The slit 62 is configured such that a portion of the rod portion 54 of the respective link 40 movably passes therebetween when articulating the wrist joint assembly (arrow C). The base portion 56 is configured to extend from either the linear actuator 38 or the hand 18. The ball joints 42 may be optimized for the wrist joint assembly (arrow C). Referring again to FIG. 5, since the angle P of the pitch motion is over twice as large as the angle Y of the yaw motion, the socket opening 60 of the socket portion 50 of the ball joint 42 is elongated in the pitch direction, i.e., as the hand 18 rotates about the pitch axis C1, to facilitate insertion of the respective ball portion 52 during assembly of the ball joint 42. The base portion 56 also presents a contact surface 66. The contact surface 66 may be a face of a screw that retracts to allow insertion of the ball portion 52 into the socket portion 50. The screw may then be screwed toward the ball portion 52 to snug the ball portion 52 into a backlash-free contact between the ball portion 52 and the screw face. The surface of the screw face and any interior contact regions of the socket portion 50 may be machined to the same spherical radius as the ball portion 52 to provide a good spherical constraint that spreads contact stresses evenly. Providing a good spherical constraint between the ball portion 52 and the socket portion 50, allows high actuation forces to be transmitted to the wrist joint assembly. In the present embodiment, the ball joints 42 may be configured to exert a force to the wrist joint assembly (arrow C) that are in excess of 530 N (120 lbf) in push or pull, without dislocating the connection between the links 40 and the ball joints 42.

Each linear actuator 38 is configured for independent linear movement, relative to the lower arm 24. Therefore, the link 40 that corresponds to the respective linear actuator 38 also moves in response to movement of the linear actuator 38. As a result of movement of the link 40, the hand 18 moves (i.e., rotates) about at least one of the yaw and pitch axes C2, C1. While the linear actuators 38 are configured to move independently, whether the hand 18 rotates about the yaw axis C2, the pitch axis C1, or the yaw and pitch axes C2, C1 simultaneously is determined by the relative movement of the linear actuators 38. More specifically, the linear actuators 38 are configured to move in the same direction at approximately the same speed to rotate the hand 18 about only the pitch axis C1 and the linear actuators 38 are configured to move in opposing directions at approximately the same speed to rotate the hand 18 only about the yaw axis C2. Therefore, the linear actuators 38 are configured to rotate the hand 18 about the pitch and yaw axes C1, C2 simultaneously by moving both of the linear actuators 38 at different speeds relative to one another.

It should be understood that due to the spatial geometry of the wrist and particularly due to its asymmetric geometry, the precise relationship between linear actuator's 38 speeds and the resulting pitch and yaw angle speeds is nonlinear. Such nonlinearities are observable in FIG. 5, where the solid curved lines represent motion in which one of the linear actuators 38 moves while the other is stationary and the dashed curved lines represent motion in which the roles of the two linear actuators 38 is reversed. For any pair of pitch and yaw angles (P,Y), the corresponding displacements of the linear actuators 38 is determined by the intersection of a solid curve with a dashed curve in FIG. 5 at (P,Y). Coordinated motion of the pitch and yaw axes is attained by computing the corresponding coordinated motion of the linear actuators 38 either by solving the nonlinear kinematic equations or by interpolating in a look-up table of pre-computed values. Details of the nonlinear calculation procedure are given below.

Figure 6:
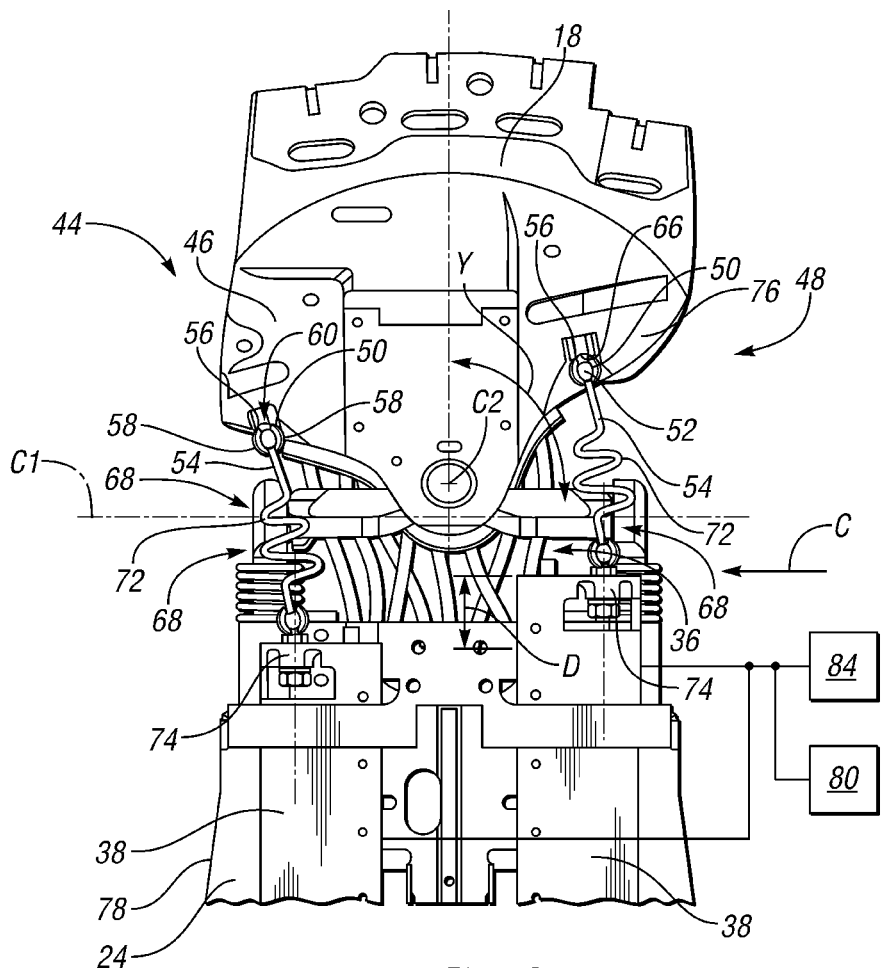
FIG. 6 is a schematic illustration of a back of the lower arm for the dexterous humanoid robot of FIGS. 1 and 3 having an alternate embodiment of the links for moving the hand.
Figure 7:
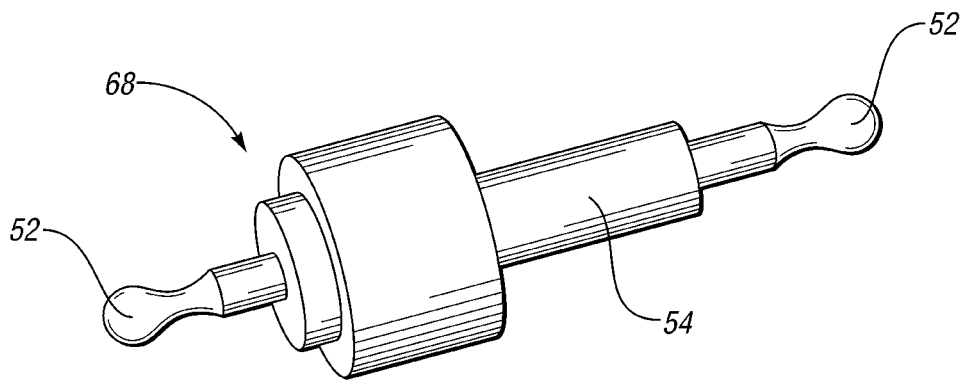
FIG. 7 is a schematic perspective illustration of another alternate embodiment of the links for moving the hand of FIG. 6.

In an alternate embodiment, shown in FIGS. 6 and 7, the wrist joint assembly (arrow C) is adapted to provide series-elastic actuation. Series-elastic actuation is provided when the linear actuator 38 drives the output through a spring element 68 instead of the links 40. By measuring the deflection D of this spring element 68 and knowing its stiffness, one can monitor the force being exerted on the wrist joint assembly (arrow C). When the robot 10 makes contact with the object, the spring element 68 absorbs the shock resulting from the contact. On a longer time scale, a robot 10 controller 70 monitors the force of the contact and can command the linear actuator 38 in a closed-loop wrist joint assembly (arrow C) to regulate the force of contact. The series-elastic actuation may be accomplished by using one of the spring elements 68 with a respective linear actuator 38. Referring to FIGS. 6 and 7, the spring element 68 may be used in place of the rigid links 40. Referring specifically to FIG. 6, the spring elements 68 are elastic members. In this embodiment, the spring elements 68 are coil springs 72 that are formed from a material with a low elastic modulus. Referring specifically to FIG. 7, the spring elements 68 are formed as a push-pull link 40 using compressible material. Alternatively, the spring element 68 may be placed within the linear actuator 38 such that the spring element 68 interconnects a head portion 74 and the socket portion 50 of the linear actuator 38. Likewise, the spring element 68 may be placed between a palm link 76 and the corresponding socket portion 50. In yet another embodiment, the spring element 68 may be attached to a frame 78 of the forearm. In these embodiments just described, the links 40 operate in pure tension/compression, due to the ball joints 42 at the opposing ends of the links 40. As a result of the pure tension/compression, lateral deflection and/or bending moments of the links 40 do not become an issue. In addition to an elastic drive-train member, such as the spring element 68, series-elastic actuation requires a measurement of the deflection of the spring element 68. In any of the above placements of the spring element 68, deflection D may be measured by a deflection measurement device 80, such as strain gauges that are mounted on the spring element 68, by magnetic Hall sensors, by optical methods, by changes in electrical resistance, or any other known device configured to measure deflection D known to those skilled in the art. An alternative to direct measurement of the spring element 68 deflection D is to measure the deflection D indirectly by measuring both the positions of the sliders and the corresponding pitch and yaw angles P, Y of the wrist joint assembly. The position of the linear actuators 38 may be measured by optical encoders on motors (not shown) that drive the linear actuators 38. Also, the pitch and yaw angles P, Y are measured by sensors (not shown), such as magnetic Hall sensors, miniature optical encoders, and the like. By measuring the pitch and yaw angles P, Y, the positions of ball centers of the socket portion 50 in the hand 18 may be calculated with respect to the lower arm 24. By measuring the positions of the linear actuators 38, the position of the corresponding centers of the ball portions 52 of the socket portion 50 in the lower arm 24 may also be determined. A distance between the ball centers at either end of a push-pull link 40 may then be calculated to reveal a deflected length of the corresponding link 40.

Additionally, an input-output relation between the pitch and yaw angles P, Y and the linear actuator 38 displacement may be calculated. Computing the displacement of each linear actuator 38 to produce a desired pitch and yaw angle P, Y is determined using the following steps. It is understood that these same steps are carried out separately for each of the two linear actuators 38 for a given pitch and yaw (P,Y). (Step 1) At the home position (P,Y)=(0,0), establish a coordinate system fixed in the lower arm 24 with origin at the ball center 42 at the head of the linear actuator 38 and with the z-axis aligned with the line of action of the actuator 38 pointing towards the hand 18. For any configuration of the wrist, let q be the displacement of the actuator 38 measured along the z-axis from the origin. By this construction, q=0 when the wrist is in the home position. (Step 2) For a general position (P,Y), compute the location of the center of the ball joint 42 at the other end of the push-pull link 40. Express this position as (x, y, z) in the coordinate system established in Step 1. It is understood that computing (x, y, z) as a function of (P,Y) is done by standard means of computing the forward kinematics of a serial-link chain, in this case such chain consisting of the lower arm 78, the intervening wrist link, and the palm link 76 with angle of rotation P about axis C1 and angle of rotation Y about axis C2. (Step 3) Let L be the known length of the push-pull link measured from one ball center 42 to the other. (Step 4) Then, the displacement q of the linear actuator is $q = z - \sqrt{L^2 - x^2 - y^2}$.

The other direction, i.e., computing the pitch and yaw given the current displacements of the linear actuators 38, is more difficult because it is governed by polynomial equations that have up to eight roots. Although an algebraic formulation of the solution may be used to obtain the pitch and yaw angles P, Y, a more computationally efficient alternative of building a 2-input, 2-output look-up table, based on the same algebraic formulation, may also be used. The look-up table may be interpolated and formed into the graphical representation 43 shown in FIG. 5. The method may be implemented to run within a control system 84 within the robot 10 that is operatively connected to the wrist joint assembly (arrow C).

While the best modes for carrying out the invention have been described in detail, those familiar with the art to which this invention relates will recognize various alternative designs and embodiments for practicing the invention within the scope of the appended claims

The invention claimed is:

1. A wrist joint assembly operatively defined between a lower arm and a hand of a humanoid robot, the wrist joint assembly comprising:
    a pair of links operatively interconnecting the lower arm and the hand;
    wherein the links extend in a spaced and generally parallel relationship to one another;
    a pair of linear actuators operatively interconnecting the lower arm and a respective one of the pair of links;
    a yaw axis;
    a pitch axis disposed in a spaced and generally perpendicular relationship to the yaw axis;
    wherein the pitch axis is disposed between the yaw axis and the lower arm such that the yaw axis and the pitch axis do not intersect one another;
    wherein the hand is rotatable relative to the lower arm about each of the yaw axis and the pitch axis;
    wherein each of the linear actuators is configured for independent linear movement, relative to the lower arm, such that the respective one of the pair of links moves in response to movement of the respective linear actuator to move the hand about at least one of the yaw axis and the pitch axis;

wherein each of the pair of linear actuators is configured to move in the same direction such as that the hand rotates at least about the pitch axis; and wherein each of the pair of linear actuators is configured to move in opposite directions such that the hand rotates at least about the yaw axis.

2. A wrist joint assembly, as set forth in claim 1, wherein the hand is configured to rotate relative to the lower arm 60 degrees about the yaw axis and 140 degrees about the pitch axis.

3. A wrist joint assembly, as set forth in claim 2, wherein the hand is configured to rotate relative to the lower arm from between −15 degrees and 45 degrees about the yaw axis.

4. A wrist joint assembly, as set forth in claim 1, wherein the wrist joint assembly defines a pass-through configured to accommodate transmission elements that connect the lower arm to at least one of the hand.

5. A wrist joint assembly, as set forth in claim 1, wherein the pair of linear actuators are configured to move simultaneously in the same direction at an equal linear speed such that the hand only rotates about the pitch axis;

wherein the pair of linear actuators are configured to move simultaneously in opposing directions at approximately equal linear speed such that the hand only rotates about the yaw axis; and wherein the pair of linear actuators are configured to move simultaneously at different linear speeds such that the hand rotates about the yaw and pitch axes simultaneously.

6. A wrist joint assembly, as set forth in claim 1, wherein each of the links are attached to the hand and the respective one of the pair of linear actuators at a ball joint.

7. A wrist joint assembly, as set forth in claim 6, wherein the ball joint includes a socket portion and a ball portion rotatably disposed in the socket portion; wherein the ball portion extends from opposing ends of each of the links.

8. A wrist joint assembly, as set forth in claim 7, wherein the socket portion includes:
a base portion;
a pair of flanges extending from the base portion in spaced relationship to define a socket opening therebetween;
wherein the socket opening is configured for receiving the respective ball portion therebetween;
wherein a slit is defined between edges of the pair of flange portions such that a portion of the respective link movably extends through the slit when the hand is moving relative to the lower arm.

9. A wrist joint assembly, as set forth in claim 8, wherein the base portion presents a contact surface facing the socket opening;
wherein the contact surface includes a screw that is configured to retract away from the socket opening to allow insertion of the ball portion into the socket portion;
wherein the screw is configured to be extended toward the socket opening to snug the ball portion into contact with the ball portion.

10. A wrist joint assembly, as set forth in claim 1, wherein at least one of the links and the respective linear actuator includes a spring element configured to provide series-elastic actuation.

11. A wrist joint assembly, as set forth in claim 10, wherein the spring element is a coil spring.

12. A wrist joint assembly, as set forth in claim 10, wherein the spring element is formed from a compressible material.

13. A wrist joint assembly, as set forth in claim 10, further comprising a deflection measurement device in operative communication with the spring element;
wherein the deflection measurement device is configured to measure deflection of the spring element.

14. A humanoid robot comprising:
a torso;
a pair of arms movably extending from the torso;
wherein each of the arms includes a lower arm and a hand, rotatable relative to the lower arm;
a neck movably extending from the torso;
a head movably extending from the neck;
a wrist joint assembly operatively defined between the lower arm and the hand, the wrist joint assembly including;
a yaw axis,
a pitch axis disposed in a spaced and generally perpendicular relationship to the yaw axis,
wherein the pitch axis is disposed between the yaw axis and the lower arm such that the yaw axis and the pitch axis do not intersect one another,
wherein the hand is rotatable relative to the lower arm about each of the yaw axis and the pitch axis; and
a control system configured for determining a yaw angle and a pitch angle of the wrist joint assembly.

15. A wrist joint assembly operatively defined between a lower arm and a hand of a humanoid robot, the wrist joint assembly comprising:
a pair of links operatively interconnecting the lower arm and the hand;
wherein the links extend in a spaced and generally parallel relationship to one another;
a pair of linear actuators operatively interconnecting the lower arm and a respective one of the pair links;
a yaw axis;
a pitch axis disposed in a spaced and generally perpendicular relationship to the yaw axis;
wherein the pitch axis is disposed between the yaw axis and the lower arm such that the yaw axis and the pitch axis do not intersect one another;
wherein the hand is rotatable relative to the lower arm about each of the yaw axis and the pitch axis;
wherein each of the linear actuators is configured for independent linear movement, relative to the lower arm, such that the respective one of the pair of links moves in response to movement of the respective linear actuator to move the hand about at least one of the yaw axis and the pitch axis;
wherein at least one of the links and the respective linear actuator includes a spring element configured to provide series-elastic actuation; and
a deflection measurement device in operative communication with the spring element; wherein the deflection measurement device is configured to measure deflection of the spring element.

16. A wrist joint assembly, as set forth in claim 15, wherein the hand is configured to rotate relative to the lower arm 60 degrees about the yaw axis and 140 degrees about the pitch axis.

17. A wrist joint assembly, as set forth in claim 16, wherein the hand is configured to rotate relative to the lower arm from between −15 degrees and 45 degrees about the yaw axis.

18. A wrist joint assembly, as set forth in claim 15, wherein the spring element is a coil spring.

19. A wrist joint assembly, as set forth in claim 15, wherein the spring element is formed from a compressible material.

\* \* \* \* \*